United States Patent
Meyer et al.

(10) Patent No.: US 6,508,941 B2
(45) Date of Patent: Jan. 21, 2003

(54) PHOTOCATALYTIC PROCESS

(75) Inventors: Jürgen Meyer, Stockstadt (DE); Hilmar Gilges, Antwerpen (BE); Ina Hemme, Hanau (DE); Anna Moiseev, Clausthal-Zellerfeld (DE); Sven-Uwe Geissen, Clausthal-Zellerfeld (DE)

(73) Assignee: Degussa AG, Düsseldorf (DE)

( * ) Notice: Subject to any disclaimer, the term of this patent is extended or adjusted under 35 U.S.C. 154(b) by 67 days.

(21) Appl. No.: 09/883,830

(22) Filed: May 25, 2001

(65) Prior Publication Data

US 2002/0027108 A1 Mar. 7, 2002

(30) Foreign Application Priority Data

Jun. 10, 2000 (EP) .......................................... 00 112 446

(51) Int. Cl.[7] .................................................. C02F 1/32
(52) U.S. Cl. ........................ 210/748; 210/763; 210/192; 210/908
(58) Field of Search ................................ 210/748, 763, 210/192, 908

(56) References Cited

U.S. PATENT DOCUMENTS

| 4,093,543 A | 6/1978 | Rodewald | 210/59 |
| 5,622,628 A * | 4/1997 | Trendell et al. | |
| 5,849,200 A | 12/1998 | Heller et al. | 210/748 |
| 6,365,007 B1 * | 4/2002 | Willner et al. | |
| 6,409,928 B1 * | 6/2002 | Gonzales et al. | |

FOREIGN PATENT DOCUMENTS

| DE | 19843845 | 3/2000 |
| EP | 0499362 | 8/1992 |
| EP | 0882674 | 12/1998 |

* cited by examiner

Primary Examiner—Betsey Morrison Hoey
(74) Attorney, Agent, or Firm—Smith, Gabrell & Russell, LLP

(57) ABSTRACT

A process for photocatalytic removal of organic substances from waste waters, wherein by way of photocatalyst use is made of granulates based on pyrogenically prepared titanium dioxide having the following physicochemical characteristic data:

| Mean grain diameter: | 10 to 150 μm |
| BET surface: | 25 to 100 m$^2$/g |
| pH value: | 3 to 6 |
| Compacted bulk density: | 100 to 1,200 g/l. |

16 Claims, 1 Drawing Sheet

Photooxidation of model substance 4-CP

PHOTOCATALYTIC PROCESS

INTRODUCTION AND BACKGROUND

The present invention relates to a process for photocatalytic removal of organic substances from waste waters.

Pyrogenic titanium oxide (commercially available as Degussa $TiO_2$ P 25) is distinguished by its variety of possible applications in the field of photocatalysis as shown in the following sources:

(R. W. Matthews, S. R. McEvoy, J. Photochem. Photobiol.A: Chem., 64 (1992) 231–246;

R. I. Bickley et.al., Journal of Solid State Chemistry, 92 (1991), 178–190;

R. Franke, C. Franke, Chemosphere, Vol. 39, No. 15 (1999), 2651–2659; and

H. Zen, JETI (1998), 46 (10), 66–67.

It is used as reference material with high photocatalytic activity; see (V. Loddo et.al., Applied Catalysis B: Environmental 20 (1999), 29 –45.)

SUMMARY OF THE INVENTION

The present invention provides a process for photocatalytic removal of organic substances from waste waters, said process being characterized in that by way of the photocatalyst use is made of granulates based on pyrogenically prepared titanium dioxide having the following physicochemical characteristic data:

| | |
|---|---|
| mean particle diameter: | 10 to 150 μm |
| BET surface area: | 25 to 100 m²/g |
| pH value: | 3 to 6 |
| compacted bulk density: | 100 to 1,200 g/l. |

The granulate that is capable of being used in accordance with the invention can be prepared by pyrogenically prepared titanium dioxide being dispersed in water and spray-dried and by the granulates obtained being optionally tempered at a temperature from 150 to 1,100° C. for a period from 1 to 8 h.

The pyrogenic titanium dioxide can be prepared from $TiCl_4$ by a known method by means of high-temperature or flame hydrolysis (Ullmanns Enzyklopädie der technischen Chemie, 4$^{th}$ Edition, Volume 21, page 464 (1982)).

The dispersion in water for preparing the granulates can exhibit a concentration of titanium dioxide from 3 to 25 wt. %.

Organic auxiliary substances may be added to the dispersion in order to enhance the stability of the dispersion and to improve the particle morphology after spray drying.

For example, the following auxiliary substances may be employed:

polyalcohols, polyethers, surfactants based on fluorohydrocarbons, alcohols.

Spray drying can be carried out at a temperature from 200 to 600° C. Spinning-disc atomizers or nozzle atomizers may be employed in this process.

Tempering of the granulates can be carried out both in a stationary bed, such as in chamber kilns for example, and in an agitated bed, such as in rotary-tube dryers for example.

By varying the feed materials and the conditions in the course of spraying and tempering, the physicochemical parameters of the granulates, such as the specific surface area, the particle-size distribution, the compacted bulk density and the pH value, can be varied within the specified limits.

No additional auxiliary substances are required for the granulation. In comparison with non-spray-dried titanium dioxide, which has no defined agglomerate size, the titanium-dioxide granulate according to the invention has a defined particle size.

The titanium-dioxide granulate according to the invention enables dust-free handling. By reason of the high compacted bulk density, less packaging effort is required for transportation.

BRIEF DESCRIPTION OF DRAWING

The present invention will be further understood with reference to the drawing which shows the rate of progression of the degradation of chlorinated hydrocarbon according to the process of the invention as compared with a standard.

DETAILED DESCRIPTION OF INVENTION

Figure 1:
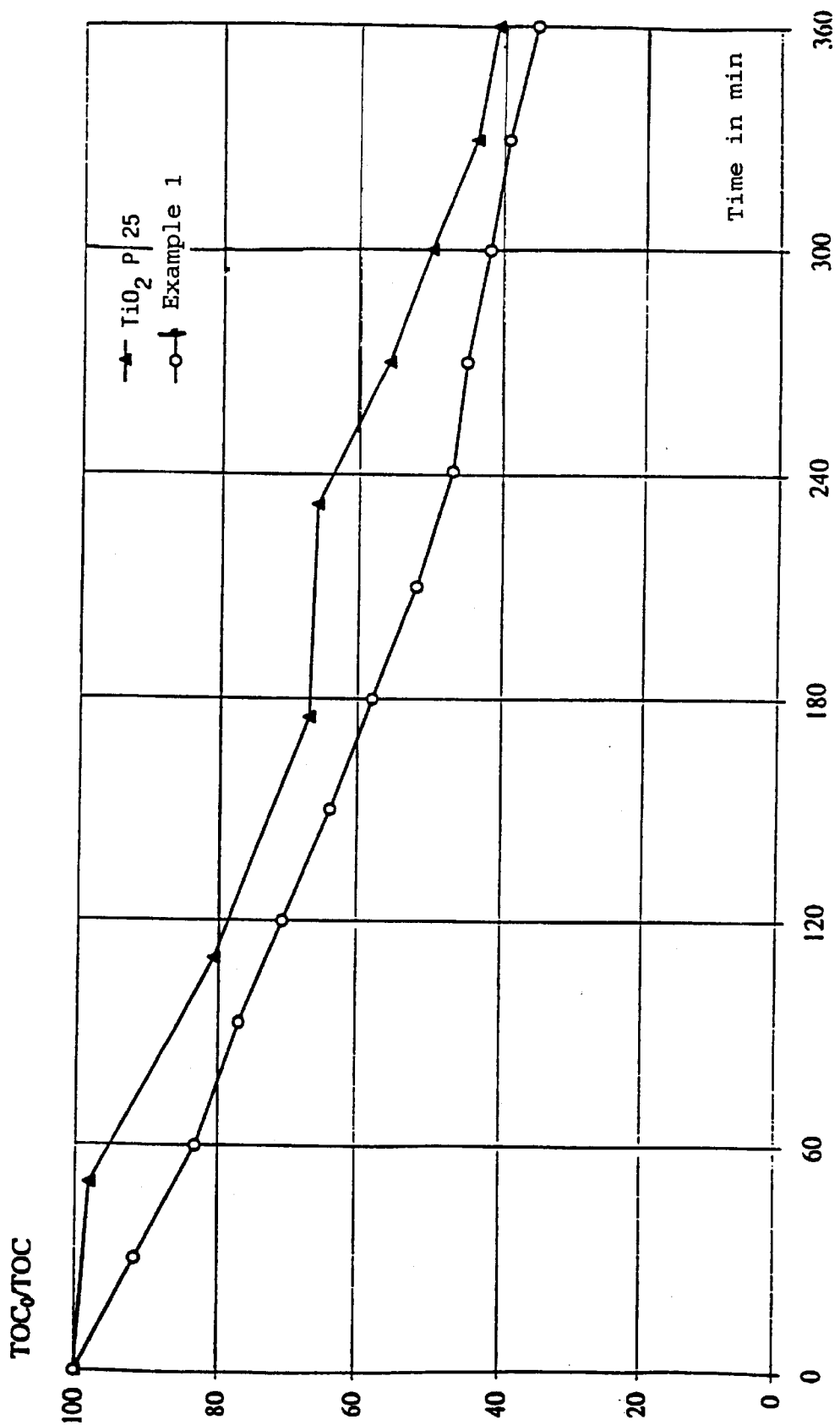

The process according to the invention can be carried out at a temperature from 20 to 40° C. The concentration of organic substances may amount to from 10 to 150 mg/ml. The organic substances that can be removed with the process according to the invention may be:

4-chlorophenol, (4-CP)

dichloroacetic acid (DCA)

trichloroethylene (TCE)

dichloroethane (DCE)

The process according to the invention has the advantage that the noxious substances are degraded more rapidly than with non-granulated titanium dioxide P 25 and that the titanium-dioxide granulate according to the invention can be separated from the reaction mixture better than non-granulated titanium dioxide P 25 (better sedimentation).

EXAMPLES

By way of pyrogenically prepared titanium dioxide a titanium dioxide P 25 having the following physicochemical characteristic data is employed. It is known from the series of publications entitled "Pigmente", No. 56: "Hochdisperse Metalloxide nach dem Aerosilverfahren", 4th Edition, February 1989, Degussa AG (Table 1)

TABLE 1

| | Titanium dioxide P 25 |
|---|---|
| CAS Registry Number | 13463-67-7 |
| Behaviour in relation to water | hydrophilic |
| Appearance | loose white powder |
| Surface according to BET[1] m²/g | 50 ± 15 |
| Mean size of primary particles nm | 21 |
| Compacted bulk density[2] g/l | about 100 |
| Specific weight[10] g/ml | about 3.7 |
| Loss on drying[3] upon leaving delivery mechanism % (2 hours at 105° C.) | <1.5 |
| Loss on ignition[4] [7] (2 hours at 1,000° C.) | <2 |
| pH value[5] (in 4-% aqueous dispersion) | 3–4 |
| $SiO_2$[8] | <0.2 |
| $Al_2O_3$[8] | <0.3 |
| $Fe_2O_3$[8] | <0.01 |
| $TiO_2$[8] | >99.5 |
| $ZrO_2$[8] | — |
| $HfO_2$[8] | — |

TABLE 1-continued

|  | Titanium dioxide P 25 |
| --- | --- |
| HCl[8)9)] | <0.3 |
| Sieve residue[6)] (according to Mocker, 45 μm) % | <0.05 |

[1)]according to DIN 66131
[2)]according to DIN ISO 787/XI, JIS K 5101/18 (not sieved)
[3)]according to DIN ISO 787/II, ASTM D 280, JIS K 5101/21
[4)]according to DIN 55921, ASTM D 1208, JIS K 5101/23
[5)]according to DIN ISO 787/IX;ASTM D 1207; JIS K 5101/24
[6)]according to DIN ISO 787/XVIII; JIS K 5101/20
[7)]relative to the substance dried for 2 hours at 105° C.
[8)]relative to the substance annealed for 2 hours at 1,000° C.
[9)]HCl content is a constituent of the loss on ignition
[10)]determined with the air-comparison pycnometer With a view to preparing the titanium dioxides, a volatile titanium compound is injected through a nozzle into an oxyhydrogen flame consisting of hydrogen and air. In most cases, titanium tetrachloride is used. This substance hydrolyzes under the influence of the water arising in the course of the hydrogen/oxygen reaction to form titanium dioxide and hydrochloric acid. After leaving the flame, the titanium dioxide enters a so-called coagulation zone in which the primary particles and primary aggregates of titanium dioxide agglomerate. The product, which at this stage is present as a type of aerosol, is separated from the gaseous companion substances in cyclones and is subsequently subjected to aftertreatment with moist hot air.

The particle sizes of the titanium dioxides can be varied with the aid of the reaction conditions, such as, for example, flame temperature, proportion of hydrogen or oxygen, amount of titanium tetrachloride, dwell-time in the flame or length of the coagulation path. These are matters understood in the art.

The BET surface area is determined with nitrogen in accordance with DIN 66 131.

The compacted bulk volume is determined following the model of ASTM D 4164-88.

Instruments: Stamping volumeter STA V 2003 produced by Engelsmann according to:
DIN 53194, Section 5.2. b-f
measuring cylinder 250 ml, graduation marks every 2 ml
balance with max. margin of error±0.1 g Implementation Set the counter mechanism of the stamping volumeter to 1,000 strokes.

Tare the measuring cylinder.

Charge granulate into the measuring cylinder up to 250-ml mark.

Note the weight of the sample (±0.1 g).

Insert the measuring cylinder into the stamping volumeter and switch the instrument on.

End of stamping → instrument switches off automatically after 1,000 strokes.

Read off the stamped bulk volume to a precision of 1 ml.

Calculation

| Calculation |  |
| --- | --- |
| E: | weight of granulate sample in g |
| V: | volume read off in ml |
| W: | water content in wt. % (determined in accordance with test specification P001) |

$$\text{compacted bulk density} = \frac{E \times (100 - W)}{V \times 100}$$

The pH value is determined in 4-% aqueous dispersion; in the case of hydrophobic catalyst supports, in water ethanol 1 : 1.

Preparation of the Granulates That Can be Used in Accordance With the Invention

The pyrogenically prepared titanium dioxide is dispersed in completely desalinated water. In this process, use is made of a dispersion unit that operates in accordance with the rotor/stator principle. The dispersions arising are spray-dried. Separation of the finished product is effected via a filter or cyclone.

Tempering of the spray granulates may be effected in muffle furnaces. The data relating to the spray drying are recorded in Table 2.

TABLE 2

Data relating to the spray drying of aqueous TiO₂P25 dispersions

| Example | Quantity of H₂O [kg] | Quantity of TiO₂P25 [kg] | Atomization with | Speed of spray disc [rpm] | Operating temperature [° C.] | Exhaust-air temperature [° C.] | Separation |
| --- | --- | --- | --- | --- | --- | --- | --- |
| 1 | 10 | 1.5 | disc | 35,000 | 345 | 100 | cyclone |
| 2 | 10 | 1.5 | disc | 45,000 | 370 | 105 | cyclone |
| 3 | 10 | 1.5 | disc | 20,000 | 350 | 95 | cyclone |
| 4 | 10 | 2.5 | disc | 15,000 | 348 | 100 | cyclone |
| 5 | 100 | 15 | 2-component nozzle | — | 445 | 130 | filter |
| 6 | 100 | 15 | disc | 10,000 | 450 | 105 | filter |
| 7 | 10 | 2.5 | disc | 20,000 | 348 | 105 | cyclone |
| 8 | 10 | 1.5 | disc | 15,000 | 348 | 105 | cyclone |
| 9 | 10 | 2.5 | disc | 35,000 | 300 | 105 | cyclone |

TABLE 3

Physicochemical data for the spray-dried products

| Example | Surface acc. to BET [$m^2/g$] | Compacted bulk density [g/l] | pH value | $d_{50}$ value (Cilas) [$\mu m$] | Loss on drying [%] | Loss on ignition [%] |
|---|---|---|---|---|---|---|
| 1 | 51 | 641 | 3.9 | 14.6 | 0.9 | 0.9 |
| 2 | 50 | 612 | 3.7 | 10.6 | 0.8 | 1.0 |
| 3 | 52 | 680 | 3.5 | 25.0 | 0.8 | 1.0 |
| 4 | 51 | 710 | 3.7 | 43.6 | 0.8 | 1.2 |
| 5 | 52 | 660 | 4.0 | 17.1 | 0.9 | 0.9 |
| 6 | 53 | 702 | 3.9 | 27.5 | 0.9 | 0.9 |
| 7 | 50 | 708 | 3.5 | 26.7 | 1.1 | 0.6 |
| 8 | 53 | 696 | 3.9 | 30.1 | 1.0 | 0.9 |
| 9 | 49 | 640 | 3.7 | 16.0 | 0.7 | 0.8 |

The process according to the invention is tested for its photocatalytic activity in the course of the photocatalytic degradation of chlorinated hydrocarbons under UV irradiation in optionally acidified, aqueous suspension.

By way of reference value (zero value), use is made of the photocatalytic rate of degradation of chlorinated hydrocarbons under UV irradiation in optionally acidified aqueous suspension when pure titanium dioxide Degussa P 25 is employed as photocatalyst. The duration of the experiments with Degussa P 25 amounts to a maximum of 360 minutes.

1. Experimental procedure for determining the rate of photocatalytic degradation of chlorinated hydrocarbons in suspension The total running-time of the experiments for the purpose of investigating the rate of photocatalytic degradation of chlorinated hydrocarbons such as 4-CP (4-chlorophenol) under UV irradiation in purely aqueous or acidified aqueous suspension amounts to a maximum of 360 minutes (min).

The degradative reaction is implemented in a stirred-tank reactor. In addition, the suspension to be investigated is pumped from the storage container to the stirred-tank reactor and back, so that a uniform UV irradiation is guaranteed. The initial pH value of the suspension lies in the range 2–6; preferably pH=2–3. The temperature in the stirred-tank reactor lies within the range from 25–40° C., preferably between 30 and 35° C. The concentration of the photocatalytically active titanium dioxide employed in the given case ($TiO_2$ P 25 or granulated $TiO_2$) amounts to 1 g/l. The concentration of the hydrocarbon is between 10 and 150 mg/l, preferably around 120 mg/l.

The temperature is maintained in the aforementioned constant range by means of continuous pumping from the storage vessel to the UV irradiation unit and back, and in addition by cooling of the UV lamp system by means of cooling water. Continuous monitoring of the progress of the degradation of the chlorinated hydrocarbons under UV irradiation takes place for the entire duration of the degradative reaction. From this determination of the TOC value (TOC=Total Organic Carbon=organically bound carbon) which takes place at regular intervals it is possible for the factor $TOC/TOC_0$ to be determined ($TOC_0$=initial concentration of the organically bound carbon in suspension). $TOC/TOC_0$ specifies the percentage TOC content at a particular time of withdrawal.

In a $TOC/TOC_0$-time curve the progression of the degradation of chlorinated hydrocarbons such as 4-CP (4-chorophenol) is plotted. The rate of degradation of $TiO_2$ P 25 is also tested under the same conditions by way of standard. The overall shape of the curve is recorded.

$TiO_2$ P 25:

120 mg/l of 4-CP (4-chlorophenol) and 1 g/l of $TiO_2$ P 25 in acidified aqueous suspension are charged into the storage vessel and into the stirred-tank reactor and treated in accordance with the manner of proceeding described above. A $TOC/TOC_0$-time curve is recorded. After 360 min., 40.5% of the initial TOC content is present.

Granulated $TiO_2$ (according to invention):

120 mg/l of 4-CP (4-chlorophenol) and 1 g/l of granulated $TiO_2$, according to Example 1, in acidified aqueous suspension are charged into the storage vessel and into the stirred-tank reactor and treated in accordance with the manner of proceeding described above. A $TOC/TOC_0$-time curve is recorded. After 360 min., 35.0% of the initial TOC content of 4-CP (4-chlorophenol) is present.

The values ascertained are represented graphically in FIG. 1.

2. Experimental results of the photocatalytic degradation of 4-CP (4-chorophenol) by means of titanium dioxide P 25 and granulated titanium dioxide after 360 minutes (min).

| Catalyst | Residual $TOC/TOC_0$ at t = 360 min. [%] | Improvement [%] |
|---|---|---|
| $TiO_2$ P 25 | 40.5 | / |
| Granulated $TiO_2$ | 35.0 | 13.6% |

Reactor volume: $V_{reactor}$=1.7 l

Total volume: $V_{reactor}$=3.0 l

Gassed constantly with $O_2$

Radiator: UVH1022 Z4 iron-doped high-pressure mercury-vapour lamp

Power output: 500 W (Heraeus)

Catalyst concentration: 1 g/l

Initial concentration of chlorinated hydrocarbons: $c_0$=120 mg/l

Initial pH value: $pH_0$=2.4

Experiments for determining the photocatalytic oxidation 0of chlorinated hydrocarbons (for example, 4-CP) under UV irradiation and using granulated titanium dioxide as photocatalyst take place in purely aqueous or acidified aqueous suspension. The suspension is constantly stirred and continuously irradiated with the iron-doped high-pressure mercury-vapour lamp UVH1022 Z4. A cooling system for the lamp is present, in order to guarantee constant conditions. The suspension is also maintained at constant temperature by continuous pumping from the storage container to the reactor and back and by additional cooling.

Further variations and modifications of the foregoing will be apparent to those skilled in the art and are intended to be encompassed by the claims appended hereto.

European application 00 112 446.0 is relied on and incorporated herein by reference.

What is claimed is:

1. A process for photocatalytic removal of organic substances from water comprising contacting said water with a pyrogenically produced titanium dioxide granulate having the following physicochemical properties:

| | |
|---|---|
| Mean particle diameter: | 10 to 150 µm |
| BET surface area: | 25 to 100 m²/g |
| pH value: | 3 to 6 |
| Compacted bulk density: | 100 to 1,200 g/l. | in the presence of UV irradiation to thereby obtain water with a reduced organic substance content.

2. The process according to claim 1, wherein said titanium dioxide is pyrogenically prepared from $TiCl_4$ by flame hydrolysis.

3. The process according to claim 2, wherein said pyrogenically prepared $TiCl_4$ is dispersed in water to form a dispersion and the dispersion is spray dried to obtain granulates.

4. The process according to claim 3, wherein said granulates are tempered at a temperature of 150 to 1100° C. for 1 to 8 hours.

5. The process according to claim 3, wherein a member selected from the group consisting of polyalcohols, polyethers and surfactants is added to said dispersion.

6. The process according to claim 3, wherein spray drying takes place at 200 to 600° C.

7. The process according to claim 3, wherein the water for dispersing the titanium dioxide is desalinated water.

8. The process for the photocatalytic removal of an organic substance from waste water comprising dispersing into water containing a chlorine containing compound selected from the group consisting of 4-chlorophenol, chichloroancetic acid, trichloraethylene, dichloraethane and mixtures thereof a pyrogenically produced titanium dioxide granulate having the following physicochemical properties:

| | |
|---|---|
| Mean particle diameter: | 10 to 150 µm |
| BET surface area: | 25 to 100 m²/g |
| pH value: | 3 to 6 |
| Compacted bulk density: | 100 to 1,200 g/l. | and subjecting said water to UV irradiation.

9. The process according to claim 8, wherein the water is a waste water effluent.

10. A process for the photocatalytic removal of an organic substance from waste water containing said organic substance comprising dispersing into said water a pyrogenically produced titanium dioxide granulate having the following physicochemical properties:

| | |
|---|---|
| Mean particle diameter: | 10 to 150 µm |
| BET surface area: | 25 to 100 m²/g |
| pH value: | 3 to 6 |
| Compacted bulk density: | 100 to 1,200 g/l. | to thereby form an aqueous dispersion, subjecting said dispersion to UV irradiation for a sufficient period of time to reduce the organic content of said dispersion.

11. The process according to claim 10, wherein the dispersion has a pH in the range of 2 to 6.

12. The process according to claim 10, wherein the dispersion has a pH in the range of 2 to 3.

13. The process according to claim 10, wherein the temperature of the dispersion when contacted with UV irradiation is 25 to 40° C.

14. The process according to claim 13, wherein the temperature is 30 to 35° C.

15. The process according to claim 10, wherein the concentration of organic substance initially present is 10 to 150 mg/l.

16. The process according to claim 10 further comprising stirring said dispersion during irradiation.

* * * * *